United States Patent [19]

Williames

[11] Patent Number: 4,761,942

[45] Date of Patent: Aug. 9, 1988

[54] FLOWER HARVESTERS

[75] Inventor: Geoffrey A. Williames, Warragul, Australia

[73] Assignee: Williames Hi-Tech International Pty. Ltd., Warragul, Australia

[21] Appl. No.: 939,570

[22] Filed: Dec. 9, 1986

[30] Foreign Application Priority Data

Dec. 11, 1985 [AU] Australia .................. PH03832
Sep. 16, 1986 [AU] Australia .................. PH08033

[51] Int. Cl.⁴ ........................... A01D 45/00
[52] U.S. Cl. ......................... 56/130; 56/13.1
[58] Field of Search ............... 56/12.9, 13.1, 130, 56/364

[56] References Cited

U.S. PATENT DOCUMENTS

| | | | |
|---|---|---|---|
| 3,212,247 | 10/1963 | Erickson | 56/13.1 |
| 3,331,195 | 7/1967 | Heth et al. | 56/13.1 |
| 3,721,075 | 3/1973 | Weiberg | 56/130 |
| 4,287,707 | 9/1981 | Parsoons et al. | 56/130 |
| 4,373,322 | 2/1983 | Beisel | 56/130 |
| 4,455,814 | 6/1984 | Kienholz | 56/130 |
| 4,578,934 | 4/1986 | Wiest | 56/12.9 |
| 4,597,252 | 7/1986 | Williames | 56/364 |

FOREIGN PATENT DOCUMENTS 1580359 12/1980 United Kingdom ............... 56/12.9

Primary Examiner—Paul J. Hirsch
Attorney, Agent, or Firm—Learman & McCulloch

[57] ABSTRACT

A mobile machine for harvesting growing flowers comprises a shroud at the forward end of the machine in which is mounted a substantially horizontally disposed, cylindrical, fluted picking rotor operable to engage the stems of plants and sweep their flower heads rearwardly into the shroud in response to movement of the machine through a field of such flowers. A rotary drum interacts with the fluted rotor to effect separation of a flower head from its stem. The drum is driven in the same direction as the picking rotor and has a peripheral speed greater than the ground speed of the machine to induce tension in the stem of an engaged plant near the flower head and relieve tension in the stem near its roots.

8 Claims, 4 Drawing Sheets

FLOWER HARVESTERS

This invention relates to flower harvesting equipment particularly for pyrethrum and boronia.

BACKGROUND OF THE INVENTION

In our earlier U.S. Pat. No. 4,597,252, Ecuador Pat. No. PI-85-074, and U.K. Pat. No. 8313744 there are disclosed several embodiments of flower harvesting machines.

The present invention is directed to an improved harvester with a view to improving the mechanical harvesting techniques particularly in the construction of the plant engaging picking head.

For the pyrethrum industry to be viable in developed countries it has been found necessary to mechanize the harvesting of the pyrethrum flowers. Careful examination has revealed that the pyrethrins are contained in the flower head and the maximum yield is at the stage of the pyrethrum flower having matured beyond the bud stage to having four or more florets opened, but not to the stage of being overblown with the petals beginning to wither at which time the pyrethrins content is diminished.

This has led to the requirement of a harvester that can selectively harvest flower heads at the optimum stage of maturity while leaving buds for further development and later harvest. The need to harvest before the flowers become overblown (over mature) requires the harvester to be able to harvest a large area in as little time as possible.

As the flower heads contain the pyrethrins it is desirable to harvest only flower heads and not harvest stem or leaf material which results in higher transport and processing costs for both drying and extraction.

In harvesting pyrethrum, a conventional harvester travelling through the crop tends to push the flowers and stems over in a wave effect, ahead of and in the direction of movement of the harvester, causing the flowers on the underside of the bushes not to be picked. Excessive pressure bearing against the stem mass in an effort to pick all the flowers increases the ratio of unwanted stem and leaf material harvested.

The use of various devices to cut the flowers automatically causes a high percentage of stem material to be harvested. Devices to separate plants into individual rows for harvesting require the harvester to be accurately driven in line with rows and result in a difficult and slow method of harvesting, particularly in large fields with uneven slopes and contours.

A major problem occurring with the harvesting of high value crops such as pyrethrum is the large quantities of stem material which are also gathered during the harvest. This excess material causes several problems:

1. The additional weight which must be transported thus incurring additional freight costs.
2. The additional drying which must be performed on the excess material, and
3. The additional sorting and refining operations which must be performed in order to separate the flower heads from the stem material before the pyrethrum can be processed.

A principal objective of the present invention is to provide a mobile harvesting machine for flower heads in which the above mentioned problems are minimized to a significant extent, if not eliminated.

SUMMARY OF THE INVENTION

There is provided according to the present invention a mobile harvesting machine for mature flower heads including a substantially horizontally disposed, rotatable, fluted, flower picking rotor, a shroud partially enclosing the picking rotor but leaving it exposed to oncoming flowers in the direction of travel of the harvesting machine, the shroud having a wall interacting with the picking rotor to engage and pick a mature flower from its associated stem for removal to a storage device.

The picking rotor may comprise a set of horizontal bars forming flutes spaced about a circumference and mounted on a spider wheel to provide openings between adjacent flutes.

The shroud is located at the forward end of a duct which allows the production of a vacuum in the area of the picking rotor to draw flower heads into interaction with the flute bars and the shroud to remove the flowers from the stems and minimize unproductive stem harvesting.

The shroud includes at its lower edge an adjustable drum for creating a twisting plucking effect on the flower head. The drum is driven at a peripheral speed greater than the ground speed of the machine when in use. Thus when the picking head and the drum engage a plant stem, tension is induced in the stem between the flower head and the drum which assists in effecting separation of the head from the stem. At the same time the faster peripheral speed of the drum relative to the ground speed of the machine will reduce or negate tension that otherwise would be induced in the stem between the drum and the rooted end of the plant. This has the effect of significantly reducing, if not eliminating, the harvesting of the useless plant stem and roots.

THE DRAWINGS

The invention will be described in greater detail with reference to the accompanying drawings in which.

DETAILED DESCRIPTION

Figure 1:
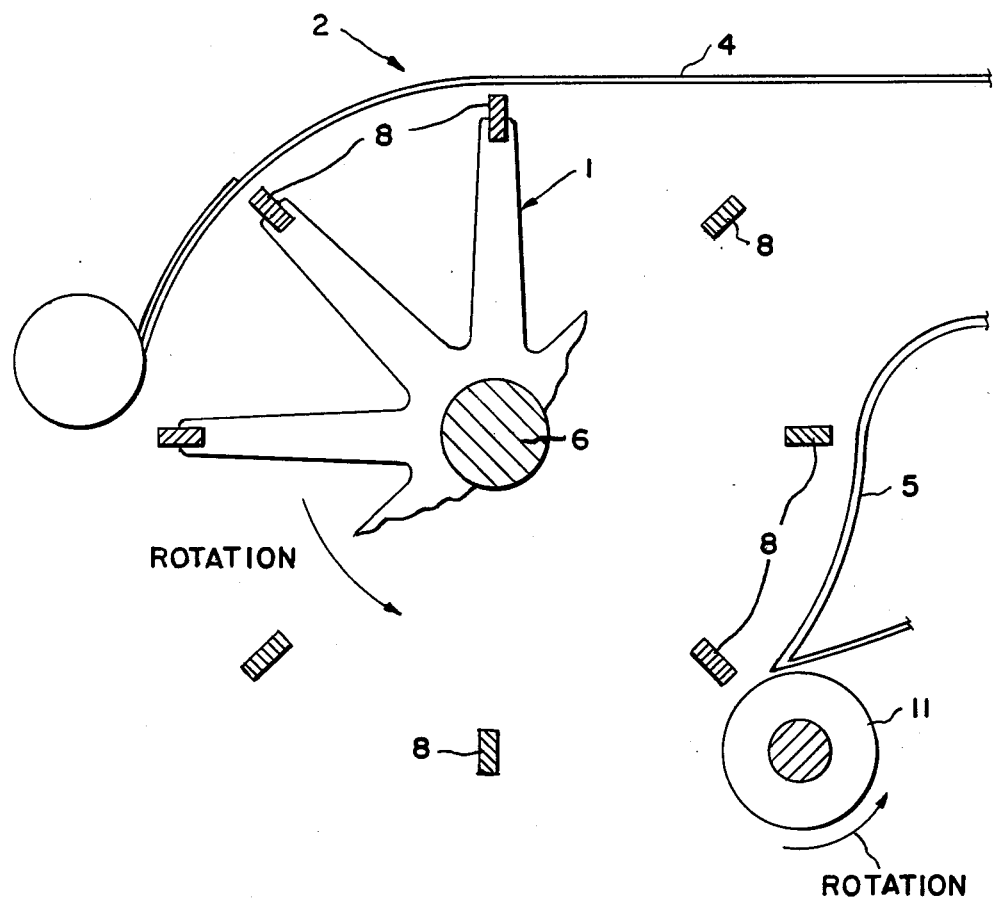
FIG. 1 is a fragmentary, diagrammatic side view, partly in section, of apparatus constructed according to the invention.

The general construction of the harvester machine has already been described in detail in the aforementioned patent specifications. The description of the present construction will be restricted to relevant portions of the picking apparatus of the harvester.

The picking apparatus includes a picking rotor 1 mounted in a shroud 2 at the forward end of a duct 3 carried by a harvesting machine that is adapted to move forwardly along a path through a field of growing flowers. The shroud has upper and lower walls 4 and 5, respectively, spaced from one another to form an opening in which a rotor 1 is accommodated. The rotor comprises a shaft 6 on which are fixed axially spaced spiders 7 fitted at their radially outer ends with axially extending, circumferentially spaced bars or flutes 8.

Figure 2:
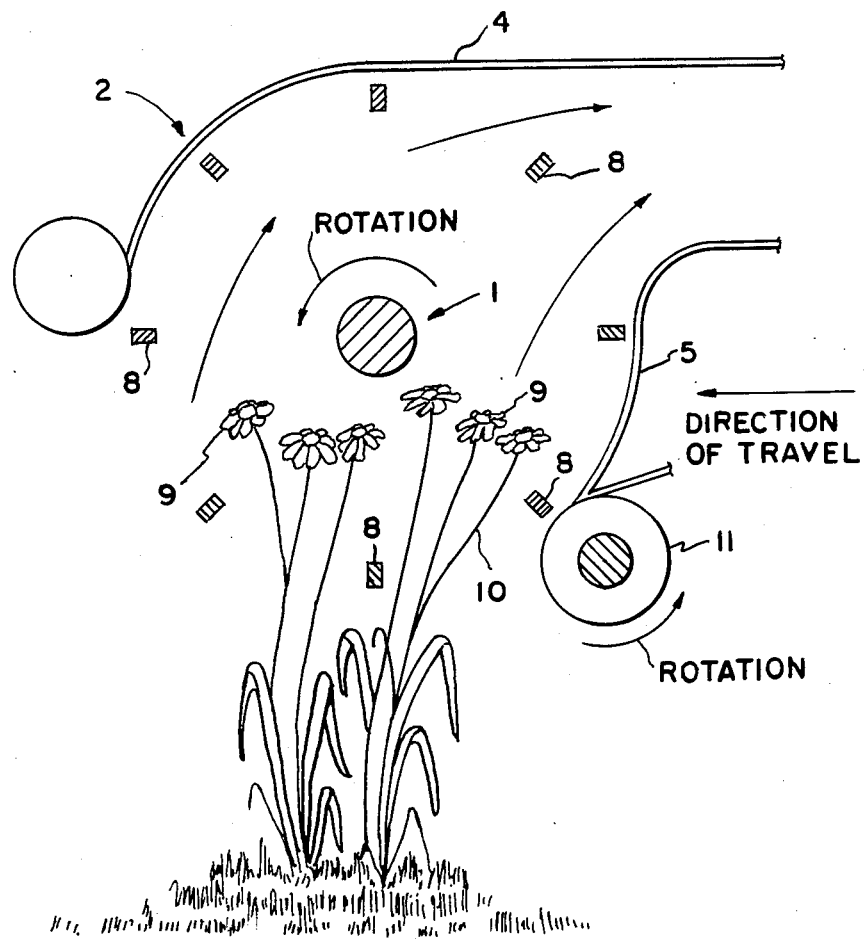
FIG. 2 is a similar view illustrating movement of the apparatus through a field of growing flowers.

Between adjacent flutes are openings in which flower heads 9 and the upper portions of their supporting stems 10 may be accommodated as is shown in FIG. 2.

The picking rotor is rotatable in known manner about a substantially horizontal axis located at such level that, as the machine moves through the field, the flutes 8 below the axis of rotation may engage the flower stems at a level between their heads 9 and their roots, as also is shown in FIG. 2.

The direction of rotation of the rotor 1 is such that the flutes 8 below the axis of rotation move in a direction rearwardly of the direction of movement of the machine through the field, thereby enabling the flutes to sweep the flower heads towards and into the shroud 2 via the opening at its forward end. See FIGS. 3 and 5. Preferably, the duct is in communication at its rearward end with a source of vacuum which establishes an air stream through the duct in a direction rearwardly from the opening in the shroud. Such air stream assists in movement of the flower heads into the shroud and conveys the harvested blown heads rearwardly to a container.

Figure 3:
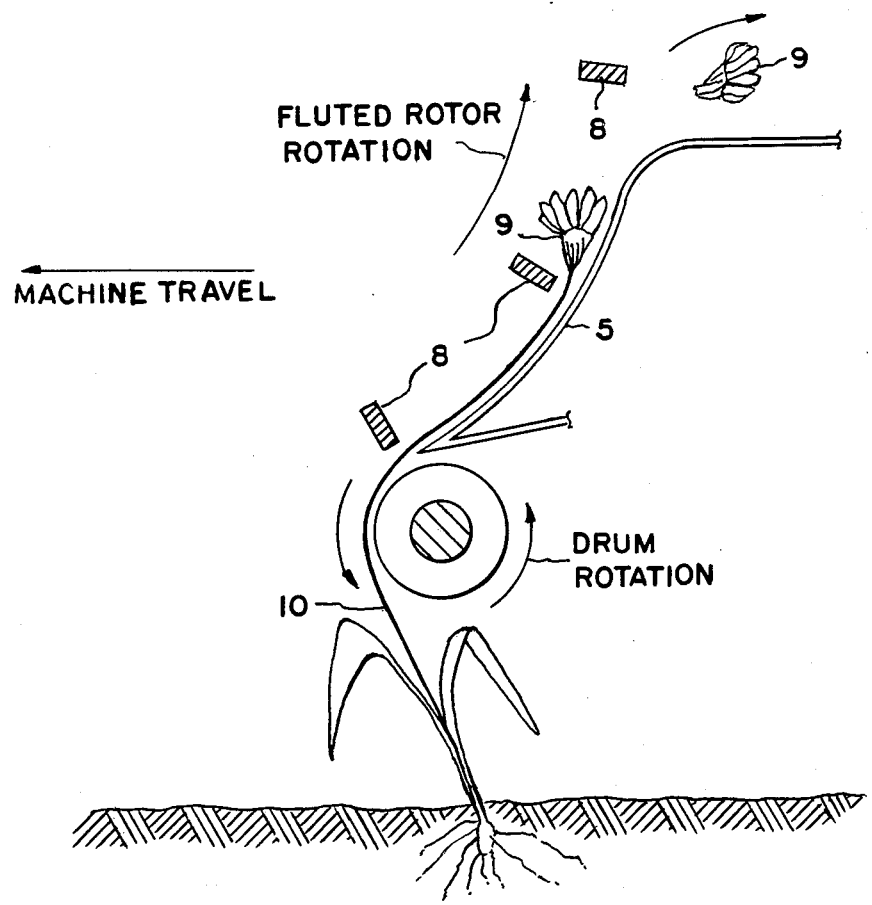
FIG. 3 is a similar view illustrating the separation of a flower head from a relatively long stem.

Flower heads 9 that are swept into the shroud lie adjacent the surface of the lower wall 5 and between the latter and the flutes 8. As is best shown in FIG. 3 the axis of rotation of the picking rotor is positioned to provide between the surface of the lower wall 5 and the tip of each flute 8 a clearance that is less than the thickness of a mature flower head 9. However, the clearance is greater than that of a stem or of an immature flower head.

At the lower edge of the shroud wall 5 is mounted a rotary drum 11 at a level to engage the stem of a flower between its flower head and its roots. As is shown in FIG. 3, the drum 11 will cause the stem of a flower whose head 9 has been swept into the shroud to be pushed in the direction of movement of the harvesting machine. This, in conjunction with continued rotation of the rotor 1, will tension that portion of the stem between the head and the drum, thereby enabling the head to be severed from the stem.

It is preferred to rotate the drum 11 in such direction that its forward surface moves downwardly, as is shown in the drawings. As a consequence, when the drum 11 engages the stem of a flower whose head has been swept into the shroud, such engagement applies a force on the stem which increases the tension therein between the drum and the flower head, and simultaneously relieves tension in that part of the stem between the drum and ground level.

The increase in tension in that portion of the stem between the drum and the flower head assists in serving the latter from the stem, whereas the relief of tension in that portion of the stem between the drum and ground level minimizes the possibility that the plant will be uprooted. Thus, the likelihood of harvesting unwanted stems, leaves, and roots is avoided or substantially minimized.

Figure 4:
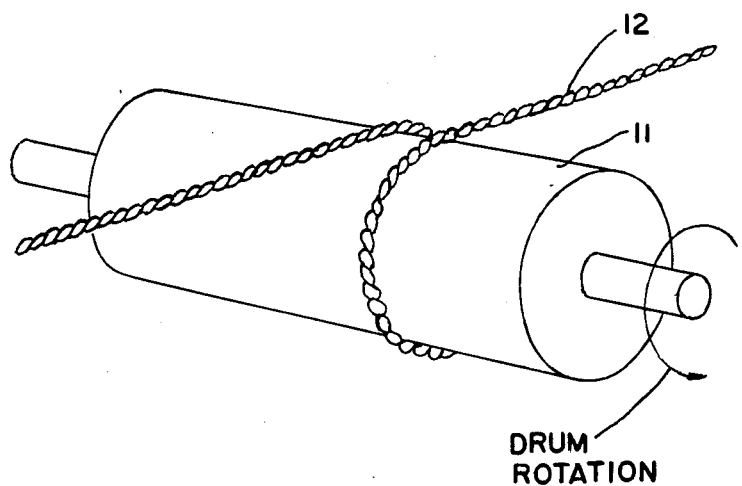
FIG. 4 is a diagrammatic view of the rotary drum.

The drum 11 is driven in the same direction as the picking rotor 1 by any convenient driving means. However, one simple way is diagrammatically illustrated in FIG. 4 wherein a driven, endless belt or chain 12 is wound around the drum thereby to drive the roller in an anti-clockwise direction (as viewed in the drawings) at a predetermined velocity.

It is preferred to rotate the drum 11 at such velocity that its peripheral speed is greater than the ground speed of the harvesting machine. This enhances the tensioning of that part of a flower stem between the drum 11 and the flower head 9 and the relieving of tension in that part of the stem between the drum and ground level. However, the principal objectives of the invention may be obtained if the peripheral speed of the drum is at or near the ground speed of the machine.

Figure 5:
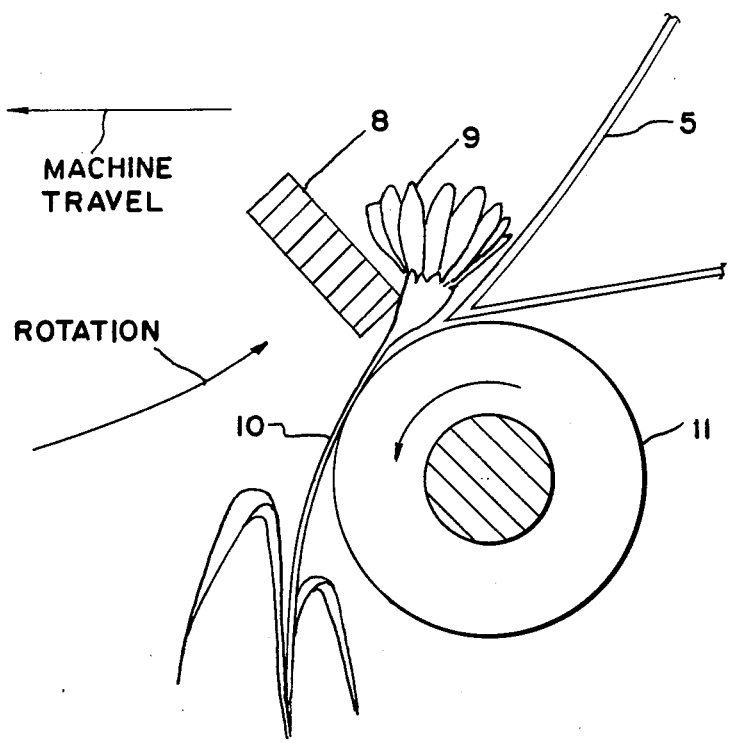
FIG. 5 is a view similar to FIG. 3 but illustrating the separation of a flower head from a relatively short stem.

In some instances a flower head 9 will be engaged simultaneously by a flute 8 and by the drum 11 as it moves toward the interior of the shroud, as is shown in FIG. 5. This will cause the head to be subjected to a twisting action which, in many cases, is sufficient to sever the head from the stem. If the head is not severed, the stem will be weakened at the base of the head thereby enabling separation to be effected by the fluted rotor shortly after the head passes the drum 11.

I claim:

1. A mobile harvesting machine movable forwardly along a path through a field of growing flowers each of which has a flower head supported above ground level by a rooted stem, said machine comprising duct means terminating at its forward end in a shroud having upper and lower wall edges spaced from one another and forming an opening; picking rotor means having axially extending, radially projecting circumferentially spaced flutes; means mounting said rotor means in said opening for rotation about a substantially horizontal axis at such level and in such direction as to enable moving flutes below said axis to engage the stems of flowers in said path at a zone between their heads and ground level and sweep their heads rearwardly of the direction of movement of said machine into said shroud, said flutes being of such radial length as to provide between said flutes and the lower wall of said shroud a clearance less than the thickness of a flower head; drum means at said edge of the lower wall of said shroud for engaging the stems of rearwardly swept heads at a level between such heads and ground level; and means for rotating said drum means in a direction to impose tension on the stems of rearwardly swept heads between such heads and said drum means and relieve tension in the stems of such rearwardly swept heads between their roots and said drum means.

2. The machine according to claim 1 wherein said drum means extends substantially parallel to said picking rotor.

3. The machine according to claim 1 wherein said drum means is rotated in the same direction as said picking rotor.

4. The machine according to claim 1 wherein said drum means is rotated at a velocity such that its peripheral speed is greater than the speed of movement of said machine along said path.

5. The machine according to claim 1 wherein said picking rotor comprises a shaft having axially spaced spiders thereon, said spiders having radial arms at the radially outer ends of which are mounted axially extending bars constituting said flutes.

6. The machine according to claim 5 wherein said picking rotor is open between adjacent flutes.

7. The machine according to claim 1 wherein said clearance is less than the thickness of a mature flower head but greater than the thickness of an immature flower head.

8. The machine according to claim 1 wherein said clearance is greater than the thickness of the stems of such flowers and less than the thickness of a mature flower head.

* * * * *